United States Patent [19]

Eguchi

[11] Patent Number: 5,327,292
[45] Date of Patent: Jul. 5, 1994

[54] LENS BARREL ATTACHMENT
[75] Inventor: Haruki Eguchi, Tokyo, Japan
[73] Assignee: Asahi Kogaku Kogyo Kabushiki Kaisha, Tokyo, Japan
[21] Appl. No.: 885,898
[22] Filed: May 20, 1992
[30] Foreign Application Priority Data
   May 21, 1991 [JP]  Japan ................... 3-045665
[51] Int. Cl.⁵ .......................... G02B 7/02; G03B 17/00
[52] U.S. Cl. ..................... 359/827; 359/811; 359/815; 354/293
[58] Field of Search .................. 359/808-830, 359/808-300; 354/192.1-195.13, 286, 293, 81, 82; 352/243; 248/123.1, 176-187, 280.1, 364

[56] References Cited
U.S. PATENT DOCUMENTS

| | | | |
|---|---|---|---|
| 3,270,994 | 9/1966 | Machan et al. | 248/187 |
| 4,187,020 | 2/1980 | Ishii et al. | 354/195.11 |
| 4,384,767 | 5/1983 | Kawai | 359/827 |
| 4,525,052 | 6/1985 | Kosugi et al. | 354/293 |
| 4,572,612 | 2/1986 | Schlapp et al. | 359/827 |
| 4,789,225 | 12/1988 | Nomura | 359/827 |
| 5,055,864 | 10/1991 | Slikkers | 354/81 |

Primary Examiner—Scott J. Sugarman
Assistant Examiner—Thong Nguyen
Attorney, Agent, or Firm—Sandler Greenblum & Bernstein

[57] ABSTRACT

A lens barrel attachment including an attachment ring and a handle in which a click pin is housed. The attachment ring is rotatably fitted on a large-sized lens barrel. The handle is threadingly fitted in a handle hole formed in the attachment ring and extending in a radial direction thereof. The click pin is provided in an accommodation hole formed in the handle and urged by a spring to be engaged with engaging recesses formed on an outer surface of the lens barrel. The handle has a contact portion at the tip portion thereof. This contact portion is brought into frictional contact with the lens barrel to thereby fix the lens barrel to the attachment ring.

11 Claims, 3 Drawing Sheets

LENS BARREL ATTACHMENT

BACKGROUND OF THE INVENTION

1. Field of the Invention

The present invention relates to a lens barrel attachment for attaching a lens barrel, especially a large-size lens barrel, to a tripod.

2. Description of the Related Art

Conventionally, a large-size lens barrel is attached to a tripod by a lens barrel attachment provided with an attachment ring having a tripod mount connected to the tripod and rotatably fitted on an outer surface of the lens barrel. Namely, the lens barrel and a camera to which the lens barrel is mounted are rotated relative to the attachment ring. Thus the posture of the camera can be changed vertically or horizontally.

This conventional lens barrel attachment is provided with a lock mechanism for locking the lens barrel and the lens barrel attachment at a predetermined position, and a click mechanism for fixing the camera when moving same vertically or horizontally. These mechanisms, however, are bulky and have a complicated structure.

SUMMARY OF THE INVENTION

Therefore, an object of the present invention is to provide a lens barrel attachment in which the size of the locking mechanism and the click mechanism is reduced and which also has a simple structure.

According to the present invention, there is provided a lens barrel attachment for attaching a lens barrel to a tripod, wherein the lens barrel has engaging recesses formed on an outer surface thereof and aligned on a circle having a center coinciding with the center of the lens barrel. The lens barrel attachment includes an attachment ring, a handle, a pin, and an urging mechanism.

The attachment ring, which is connected to the tripod, is rotatably fitted on the outer surface of the lens barrel and provided with a handle hole extending in a radial direction thereof. A handle is movably fitted in the handle hole and has a contact portion that can be brought into frictional contact with the lens barrel. The pin is supported by the handle for movement in a radial direction of the attachment ring, and is engagable with the engaging recesses. The urging mechanism urges the pin so that a tip portion thereof is projected onto the lens barrel relative to the contact portion, and is engaged with one of the engaging recesses.

Further, according to the present invention, there is provided a lens barrel attachment for attaching a lens barrel to a tripod, wherein the lens barrel has engaging recesses formed on an outer surface thereof, and aligned on a circle having a center coinciding with the center of the lens barrel. The lens barrel attachment includes an attachment ring, a handle, a pin and an urging mechanism.

The attachment ring, which is connected to the tripod, rotatably fitted on the outer surface of the lens barrel, and provided with a handle hole extending in a radial direction thereof. A handle is threadingly and rotatably fitted in the handle hole in such a manner that a tip portion of the handle is pressed against or released from contact with the lens barrel. The pin is supported by the handle for movement in a radial direction of the attachment ring, and is engagable with the engaging recesses. The urging mechanism urges the pin so that a tip portion of the pin is projected onto the lens barrel, relative to the contact portion, and engaged with one of the engaging recesses.

Still further, according to the present invention, there is provided a lens barrel attachment for attaching a lens barrel to a tripod, wherein the lens barrel has engaging recesses formed on an outer surface thereof. The lens barrel attachment includes an attachment ring, a handle, a pin, an urging mechanism, and a connecting mechanism.

The attachment ring is rotatably fitted on the outer surface of the lens barrel, and provided with a handle hole extending in a radial direction thereof. The handle is threadingly fitted in the handle hole and has a tip portion that can be brought into frictional contact with the outer surface of the lens barrel. The pin is supported by the handle and is engagable with the engaging recesses. The urging mechanism urges the pin so that a tip portion of the pin is engaged with one of the engaging recesses. The connecting mechanism connects the attachment ring to tripod.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
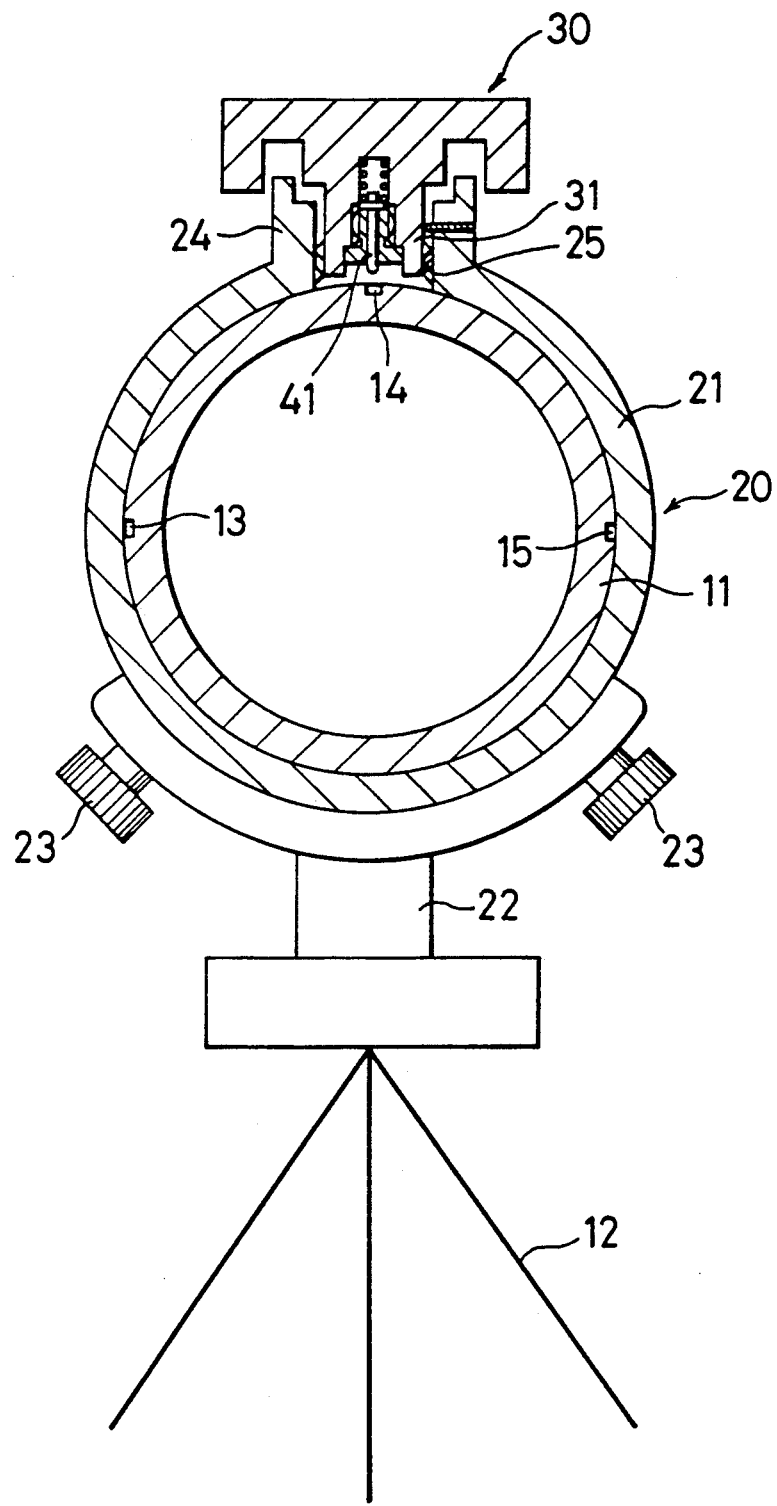
FIG. 1 is a sectional view showing a lens barrel attachment of an embodiment of the present invention.

The present invention will now be described with reference to embodiments shown in the drawings.

In FIG. 1, a lens barrel 11 is attached to a tripod 12 by a lens barrel attachment 20, of an embodiment according to the present invention. The lens barrel attachment 20 has an attachment ring 21, and a tripod mount 22 fixed to the attachment ring 21 through screws 23. The tripod mount 22 is connected to the tripod 12 through a screw formed in the tripod mount 22, when a photographing is to be carried out while using the tripod 12.

The attachment ring 21 is rotatably fitted on an outer surface of the lens barrel 11 in such a manner that the lens barrel 11 and a camera (not shown), to which the lens barrel 11 is mounted, can be rotated relative to the attachment ring 21. Note, in FIG. 1 since the construction of the lens barrel 11 is not relevant to the present invention, the lens barrel 11 is shown simply as a cylinder.

The lens barrel 11 has engaging recesses 13, 14 and 15 formed on an outer surface thereof and aligned on a circle having a center coinciding with the center of the lens barrel 11. These engaging recesses 13, 14 and 15 are provided at 90 degree intervals. The recess 14, positioned at the center thereof, is used for positioning the lens barrel 11 and the camera horizontally. The recesses 13 and 15, positioned at the right and left sides thereof, are used for positioning the lens barrel 11 and the camera vertically. Note, the positioning and number of engaging recesses 13, 14 and 15 can be changed, if necessary.

The attachment ring 21 is provided with a cylindrical portion 24 formed at the opposite side to the tripod mount 22, and projects outwardly in a radial direction of the attachment ring 21. A handle hole 25 is formed in the cylindrical portion 24. An internal thread is formed on a wall of the handle hole 25. A handle 30 is movably fitted in the handle hole 25. Namely, the handle has a thread portion 31 having an external thread which is threadingly fitted in the handle hole 25. Thus the handle 30 is moved along the axis thereof by a rotation thereof. A click pin 41, engagable with the engaging recesses 13, 14 and 15, is provided in the handle 30.

Figure 2:
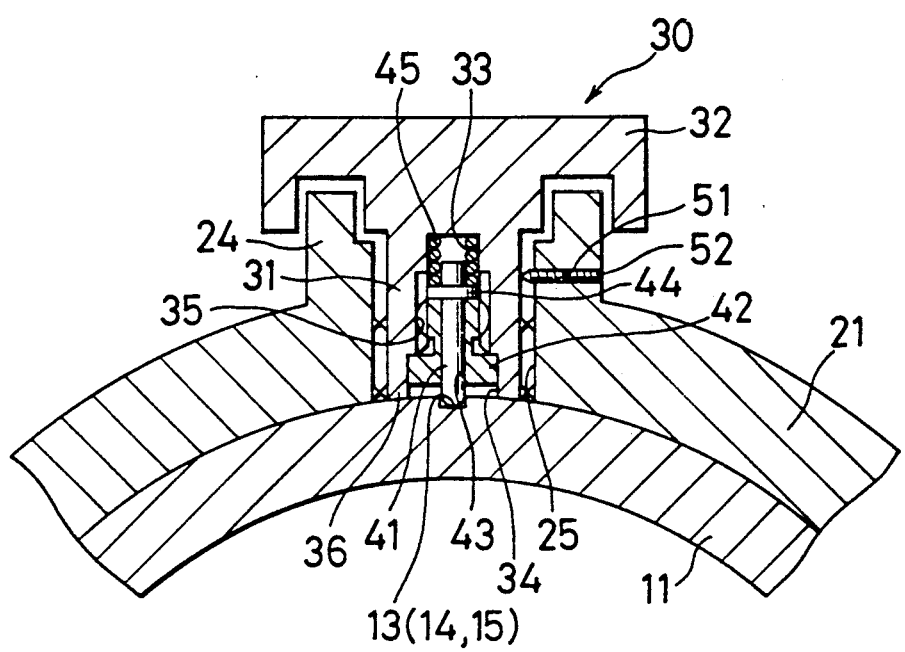
FIG. 2 is an enlarged sectional view showing the lens barrel attachment in a locked state.

The constructions of the handle 30, and members assembled in the handle 30, are described with reference to FIGS. 2 and 3.

The handle 30 has an operating portion 32 on the top end thereof, with the operating portion 32 protruding over the top end of the cylindrical portion 24. An accommodation hole 33 is formed in the handle 30, and has an opening 34 at the lower end of the handle 30. A retainer 42 is fixed against rotation and is vertically movable along internal guides 35 in the accommodation hole 33. The retainer 42 has a hole 43 in which the click pin 41 is slidably inserted. A flange 44 is formed at the top end portion of the click pin 41. A coil spring 45 is housed in the accommodation hole 33 and engaged with a bottom of the accommodation hole 33 and the flange 44. Namely, the click pin 41 is urged by the coil spring 45, so that the flange 44 is engaged with a top surface of the retainer 42. Thus the tip portion of the click pin 41 is always projected from the retainer 42 and the opening 34.

A contact portion 36 is provided on an lower end of the thread portion 31 of the handle 30, this contact portion 36 being annular and coaxial with the click pin 41. The contact portion 36 is protruded onto the lens barrel 11 relative to the retainer 42, and retracted outwardly relative to the tip portion of the click pin 41, in a state in which the flange 44 is engaged with the retainer 42. The contact portion 36 can be brought into frictional contact with an outer surface of the lens barrel 11.

A screw hole 51 is formed in the cylindrical portion 24 and extended horizontally in the drawings. A set screw 52 is threadingly fitted in the cylindrical portion 24. A tip portion of the set screw 52 is in contact with the handle 30 to prevent a separation of the handle 30 from the handle hole 25.

An operation of the lens barrel attachment 20 is described below.

Figure 3:
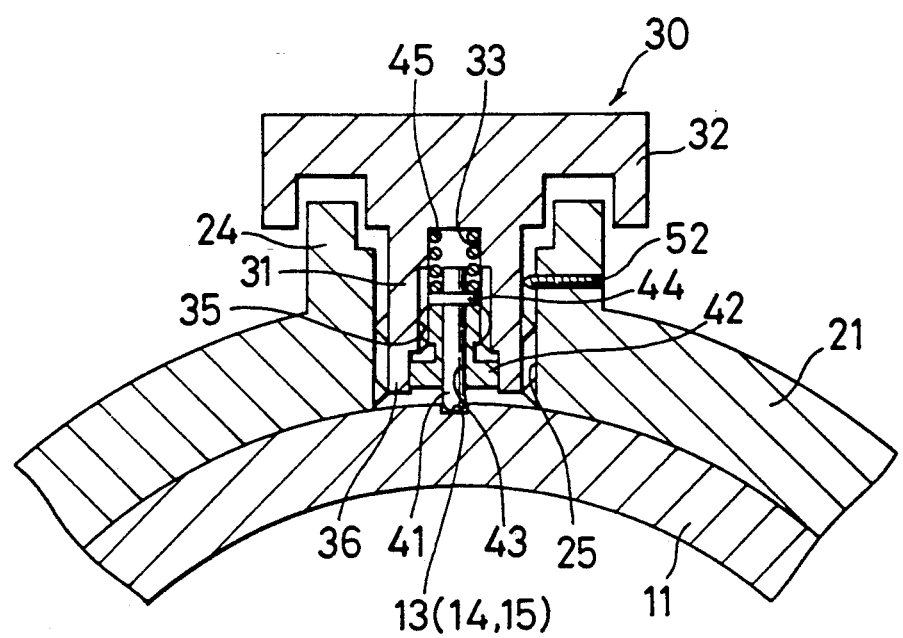
FIG. 3 is an enlarged sectional view showing the lens barrel attachment in a click stop (i.e., pin and recess engagement) state.

When the lens barrel 11 is intended to be rotated relative to the lens barrel attachment 20, the set screw 52 is first loosened, and then the handle 30 is rotated to be moved away from the lens barrel 11, so that the contact portion 36 is thereby taken out of contact with the outer surface of the lens barrel 11, as shown in FIG. 3. At this time, the tip portion of the click pin 41 is still projected onto the lens barrel 11 relative to the contact portion 36, to be engaged with one of the engaging recesses 13, 14, 15, because the click pin 41 is urged in that direction by the coil spring 45.

Figure 4:
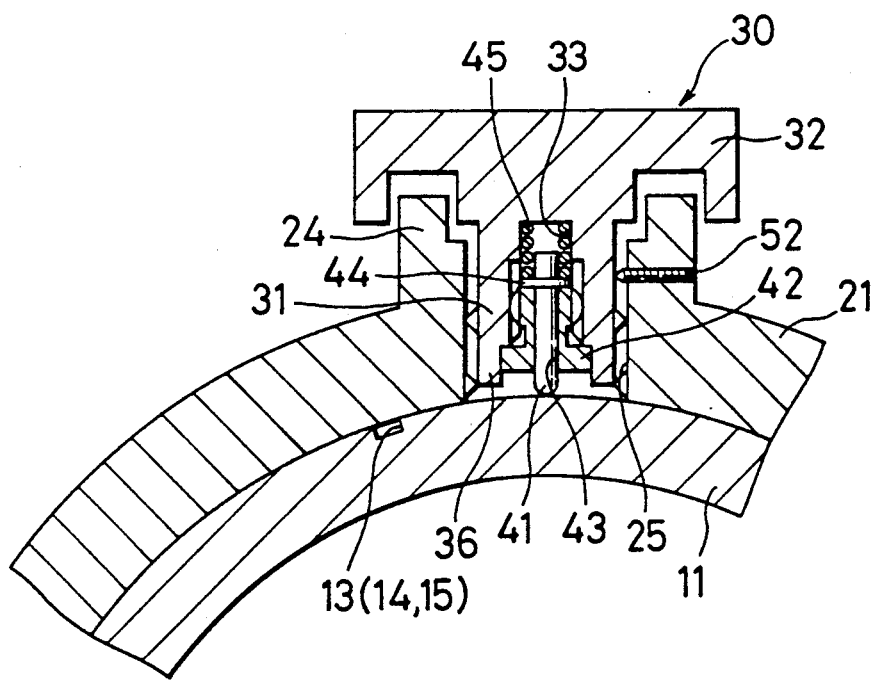
FIG. 4 is an enlarged sectional view showing the lens barrel attachment in a state in which the lens barrel is rotated relatively to the lens barrel attachment.

Then, as shown in FIG. 4, the lens barrel 11 is rotated to change the posture of the camera. As a result, the click pin 41 is moved in a radial direction of the attachment ring 21, whereby the tip portion of the click pin 41 is released from the engaging recess 13 (14, 15). When the click pin 41 is moved and located at the next engaging recess corresponding to the new posture of the camera, the click pin 41 is engaged with this engaging recess as shown in FIG. 3. Thus, any movement of the lens barrel 11 is prevented.

Then, the handle 30 is rotated to be moved inward so that the contact portion 36 is brought into contact with the lens barrel 11. The set screw 52 is rotated to be engaged with the handle 30, as shown in FIG. 2. At this time, due to a rotation of the handle 30, the click pin 41 is moved outwardly by compressing the coil spring 45. Accordingly, the lens barrel 11 is fixed to the attachment ring 21.

Note, when the click pin 41 is engaged with the engaging recess 14, the camera is set at a required horizontal posture, and when the click pin 41 is engaged with the engaging recess 13 or 15, the camera is set at a required vertical posture.

As described above, in the lens barrel attachment of the embodiment, the handle 30, threadingly fitted in the handle hole 25, is provided with the contact portion 36. The click pin 41 is provided in the handle 30. Therefore, when the handle 30 is loosened, the click mechanism, by which the click pin 41 is engaged with one of the engaging recesses 13, 14 and 15 is operated. When the handle 30 is tightened, the lock mechanism by which the contact portion 36 is pressed against the lens barrel 11, to thereby fix the lens barrel 11 to the attachment ring 21, is operated. Accordingly, the click mechanism and the lock mechanism have a simple structure, and therefore, are smaller than such a conventional device. Further, the handle 30, the click pin 41, the retainer 42, and the spring 45 are integrated so to be assembled in one body. The handle 30 is then screwed into the handle hole 25, whereby a process of assembling the lens barrel attachment 20 is completed. Namely, this assembling process is very easy.

Although the embodiments of the present invention have been described herein with reference to the accompanying drawings, obviously many modifications and changes may be made by those skilled in this art without departing from the scope of the invention.

The present disclosure relates to subject matter contained in Japanese Utility Model Application No. 3-45665 (filed on May 21 , 1991) which is expressly incorporated herein by reference in its entirety.

I claim:

1. A lens barrel attachment for attaching a lens barrel to a tripod, said lens barrel having engaging recesses formed on an outer surface thereof and aligned on a circle having a center coinciding with a center of said lens barrel, said lens barrel attachment comprising:

an attachment ring connected to said tripod at a first portion, said attachment ring being rotatably fitted on said outer surface of said lens barrel and provided with a handle hole extending in a radial direction thereof;

a handle movably fitted in said handle hole and having a contact portion able to be brought into frictional contact with said lens barrel;

a pin supported by said handle and movable in a radial direction of said attachment ring; and means for urging said pin so that a tip portion of said pin is objected onto said lens barrel relative to said contact portion, to be thereby engaged with one of said engaging recesses;

wherein said handle is threadingly fitted in said handle hole, and is rotatable therein such that said contact portion selectively comes into contact with said lens barrel or is separated from said lens barrel.

2. A lens barrel attachment according to claim 1, wherein said handle is provided with an accommodation hole in which said pin is housed.

3. A lens barrel attachment according to claim 2, further comprising a retainer movably mounted in said accommodation hole and having a hole in which said pin is slidably inserted.

4. A lens barrel attachment according to claim 3, wherein said urging means is a spring housed in said accommodation hole and urging said pin to project from said retainer.

5. A lens barrel attachment according to claim 1, wherein said contact portion is annular and coaxial with said pin.

6. A lens barrel attachment according to claim 1, wherein said handle hole is provided at a second portion which is different from said first portion of said attachment ring to which said tripod is connected.

7. A lens barrel attachment according to claim 1, wherein said handle hole is located at a second portion which is at a position opposite to said first portion of said attachment ring to which said tripod is connected.

8. A lens barrel attachment for attaching a lens barrel to a tripod, said lens barrel having engaging recesses formed on an outer surface thereof and aligned on a circle having a center coinciding with a center of said lens barrel, said lens barrel attachment comprising:
 an attachment ring connected to said tripod, said attachment ring being rotatably fitted on sad outer surface of said lens barrel and provided with a handle hole extending in a radial direction thereof;
 a handle threadingly fitted in said handle hole, to be thereby rotatable in said handle hole such that a tip portion of said handle is selectively pressed against said lens barrel or separated from said lens barrel;
 a pin supported by said handle and movable in a radial direction of said attachment ring; and
 means for urging said pin so that a tip portion of said pin is projected onto said lens barrel relative to said contact portion, to be thereby engaged with one of said engaging recesses.

9. A lens barrel attachment for attaching a lens barrel to a tripod, said lens barrel having engaging recesses formed on an outer surface thereof, said lens barrel attachment comprising:
 an attachment ring rotatably fitted on said outer surface of said lens barrel and provided with a handle hole extending in a radial direction thereof;
 a handle threadingly fitted in said handle hole and having a tip portion able to be brought into frictional contact with said outer surface of said lens barrel;
 a pin supported by said handle;
 means for urging said pin so that a tip portion of said pin is engaged with one of said engaging recesses; and
 means for connecting said attachment ring to said tripod.

10. A lens barrel attachment for attaching a lens barrel to a tripod, said lens barrel having engaging recesses formed on an outer surface thereof and aligned on a circle having a center coinciding with a center of said lens barrel, said lens barrel attachment comprising:
 an attachment ring connected to said tripod at a first portion, said attachment ring being rotatably fitted on said outer surface of said lens barrel and provided with a handle hole extending in a radial direction thereof;
 a handle movably and threadably fitted in said handle hole and having a contact portion above to be brought into frictional contact with said lens barrel, said handle being rotatable in said handle hole such that said contact portion selectively comes into contact with said lens barrel or is separated from said lens barrel;
 a pin supported by said handle and movable relatively to said handle in a radial direction of said attachment ring; and
 means for urging said pin so that a tip portion of said pin is projected onto said lens barrel relative to said contact portion, to be thereby engaged with one of said engaging recesses.

11. A lens barrel attachment according to claim 10, wherein said contact portion is annular-shaped and coaxial with said pin.

* * * * *

UNITED STATES PATENT AND TRADEMARK OFFICE
CERTIFICATE OF CORRECTION

PATENT NO. : 5,327,292
DATED : July 5, 1994
INVENTOR(S) : H. EGUCHI

It is certified that error appears in the above-indentified patent and that said Letters Patent is hereby corrected as shown below:

At column 4, line 64 (claim 1, line 17), change "objected" to ---projected---.
At column 5, line 32 (claim 8, line 7), change "sad" to ---said---.
At column 6, line 29 (claim 10, line 12), change "above" to ---able---.

Signed and Sealed this

Fourteenth Day of March, 1995

BRUCE LEHMAN

Attest:

Attesting Officer

Commissioner of Patents and Trademarks